United States Patent
Ji et al.

(10) Patent No.: US 12,289,715 B2
(45) Date of Patent: Apr. 29, 2025

(54) METHODS AND APPARATUSES TO CONFIGURE A DUAL-MODE SIDELINK LOGICAL CHANNEL WITH SIMULTANEOUS MODE 1 AND MODE 2 TRANSMISSION

(71) Applicant: NOKIA TECHNOLOGIES OY, Espoo (FI)

(72) Inventors: Lianghai Ji, Aalborg (DK); Ling Yu, Kauniainen (FI); Jedrzej Stanczak, Wroclaw (PL); Jakob Lindbjerg Buthler, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 254 days.

(21) Appl. No.: 17/773,370

(22) PCT Filed: Oct. 27, 2020

(86) PCT No.: PCT/EP2020/080157
§ 371 (c)(1),
(2) Date: Apr. 29, 2022

(87) PCT Pub. No.: WO2021/083880
PCT Pub. Date: May 6, 2021

(65) Prior Publication Data
US 2022/0400490 A1    Dec. 15, 2022

Related U.S. Application Data

(60) Provisional application No. 62/927,367, filed on Oct. 29, 2019.

(51) Int. Cl.
*H04W 4/00*    (2018.01)
*H04W 72/0453*    (2023.01)
(Continued)

(52) U.S. Cl.
CPC ....... *H04W 72/0453* (2013.01); *H04W 72/23* (2023.01); *H04W 92/18* (2013.01)

(58) Field of Classification Search
None
See application file for complete search history.

(56) References Cited

U.S. PATENT DOCUMENTS

2019/0007930 A1    1/2019  Zhao et al.
2019/0149365 A1*   5/2019  Chatterjee ........... H04L 25/0226
                                                    370/329

FOREIGN PATENT DOCUMENTS

WO    2019/160489 A1    8/2019

OTHER PUBLICATIONS

International Search Report and Written Opinion dated Dec. 7, 2020 corresponding to International Patent Application No. PCT/EP2020/080157.

(Continued)

*Primary Examiner* — Zewdu A Beyen
(74) *Attorney, Agent, or Firm* — Barta Jones, PLLC

(57) ABSTRACT

Systems, methods, apparatuses, and computer program products for configuring a dual-mode SL LCH with simultaneous mode 1 and mode 2 transmission are provided. One method may include configuring one or more dual-mode sidelink (SL) logical channels (LCHs) to at least one user equipment to enable simultaneous sidelink mode 1 and sidelink mode 2 transmission. The method may also include receiving, from the at least one user equipment, at least one sidelink (SL) buffer status report (BSR) that may optionally comprise buffer status for one or more of the configured dual-mode logical channels (LCHs) according to a network configuration, and transmitting, to the at least one user (Continued)

equipment, a resource allocation that can be applied for the dual-mode logical channels (LCHs) according to the network configuration.

23 Claims, 4 Drawing Sheets

(51) Int. Cl.
*H04W 72/23* (2023.01)
*H04W 92/18* (2009.01)

(56) References Cited

OTHER PUBLICATIONS

Huawei et al., "Discussion about mode coexistence for NR sidelink," 3GPP Draft; R2-1913700, 3GPP TSG-RAN WG2 #107bis, Chongqing, China, Oct. 14-18, 2019, Oct. 4, 2019, XP051805165.

Vivo, "Discussion on support of simultaneous mode 1 and mode 2," 3GPP Draft; R2-1910222, 3GPP TSG-RAN WG2 Meeting #107, Prague, Czech Republicat, Aug. 26-30, 2019, Aug. 16, 2019, XP051768003.

Huawei et al., "Discussion on SL BSR procedure for NR SL Mode-1," 3GPP Draft; R2-1907449, 3GPP TSG-RAN WG2 Meeting #106, Reno, USA, May 13-17, 2019, May 13, 2019, XP051730885.

Intel Corporation, "Design aspects for NR V2X sidelink communication in resource allocation Mode-1," 3GPP Draft; R1-1906795, 3GPP TSG RAN WG1 Meeting #97, Reno, USA, May 13-17, 2019, May 13, 2019, XP051728246.

Huawei et al., "RAN2 impacts on simultaneous mode-1 and mode-2 configuration for NR SL communication," 3GPP Draft, R2-1909131, 3GPP TSG-RAN WG2 #107, Prague, Czech Republic, Aug. 26-30, 2019.

InterDigital Inc., "RAN2 Aspects of Simultaneous Configuration of Mode 1 and Mode 2," 3GPP Draft; R2-1909591, 3GPP RAN WG2 Meeting #107, Prague, Czech Republic, Aug. 26-30, 2019.

Ericsson, "Simultaneous configuration of mode-1 and mode-2," 3GPP Draft, R2-1910313, 3GPP TSG-RAN WG2 #107, Prague, Czech, Aug. 26-30, 2019.

Intel Corporation, "Simultaneous operation of mode1 and mode2 in NR V2X," 3GPP Draft, R2-1910382, 3GPP TSG-RAN WG2 Meeting #107, Prague, Czech Republic, Aug. 26-30, 2019.

Motorola Mobility et al., "Subtopics to be addressed in Sim M1M2," 3GPP Draft; R2-1910442, 3GPP TSG RAN WG2 Meeting 107, Prague, Czech Republic, Aug. 26-30, 2019.

Huawei et al., "Discussion about mode coexistence for NR sidelink," 3GPP Draft; R2-1911083, 3GPP TSG-RAN WG2 #107, Prague, Czech Republic, Aug. 26-30, 2019.

"New WID on 5G V2X with NR sidelink", 3GPP TSG RAN Meeting #83, RP-190766, Agenda: 9.1.1, LG Electronics, Mar. 18-21, 2019, 8 pages.

"Discussion on the support of simultaneous mode 1 and mode 2", 3GPP TSG-RAN WG2 Meeting #108, R2-1915195, Agenda: 6.4.8, Nokia, November 18-22. 2019, 3 pages.

Office action received for corresponding European Patent Application No. 20800062.0, dated Nov. 7, 2024, 8 pages.

Office action received for corresponding Chinese Patent Application No. 202080084611.2, dated Nov. 27, 2024, 14 pages of office action and no page of translation available.

"Network controlled sidelink resource allocation design for NR V2X communication", 3GPP TSG RAN WG1 Meeting #96bis, R1-1904295, Agenda: 7.2.4.2.1, Intel Corporation, Apr. 8-12, 2019, pp. 1-8.

\* cited by examiner

METHODS AND APPARATUSES TO CONFIGURE A DUAL-MODE SIDELINK LOGICAL CHANNEL WITH SIMULTANEOUS MODE 1 AND MODE 2 TRANSMISSION

CROSS-REFERENCE TO RELATED APPLICATIONS

This application claims priority from U.S. provisional patent application No. 62/927,367 filed on Oct. 29, 2019. The contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for configuring a dual-mode sidelink (SL) logical channel (LCH) with simultaneous mode 1 and mode 2 transmission.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

One embodiment may be directed to a method that may include configuring one or more dual-mode sidelink logical channel(s) (LCHs) to one or more UE(s) to enable simultaneous sidelink mode 1 and sidelink mode 2 transmission. The method may also include receiving, from the UE(s), at least one sidelink (SL) buffer status report (BSR) that may or may not include buffer status for one or more of the configured dual-mode logical channel(s) (LCHs) according to a network configuration. The method may further include transmitting or providing, to the UE(s), mode 1 resource allocation that may or may not be applied for the dual-mode logical channel(s) (LCHs) according to the network configuration.

In a variant, when the dual-mode sidelink (SL) logical channel(s) (LCHs) is configured, the method may include configuring the user equipment (UEs) with a criteria for selecting one of the sidelink mode 1 or the sidelink mode 2 for data transmission of the configured dual-mode sidelink (SL) logical channel(s) (LCHs) and a corresponding sidelink (SL) buffer status report (BSR) configuration. In another variant, the method may also include adjusting the network configuration according to the received sidelink buffer status report.

In a variant, the method may include configuring each dual-mode SL LCH(s) with two sets of logical channel prioritization (LCP) configurations, where one LCP configuration is for mode 1 operation and the other LCP configuration is for mode 2 operation. According to a variant, the LCP configuration for mode 1 may indicate how the data from the dual-mode SL LCH(s) should be multiplexed with the data from other SL LCH(s) by using the mode 1 resource. According to a variant, the LCP configuration for mode 2 may indicate the policy regarding how the data from the dual-mode SL LCH(s) should be multiplexed with the data from other SL LCH(s) by using the mode-2 resource.

In a variant, the method may include configuring a rule or criteria regarding how the dual-mode SL LCH(s) uses a configured resource (e.g., the SL grant of mode 1). For example, in one variant, the configuring may include configuring the maximum and/or minimum number of bits for the dual-mode SL LCH(s) to set as the limitation on usage of SL grant of mode 1 or to set as the limitation on usage of SL mode 2, where the remaining bits may be set to use for SL grant of the other operating mode. In another variant, the configuring may include configuring a set of maximum and/or minimum number of bits, where each set corresponds to different mode 2 resource pool conditions. According to another variant, the configuring may include associating the number of bits of dual-mode SL LCH(s) that can use SL grant of mode 1 with a buffer size reported by the UE in the SL BSR.

According to a variant, the method may include configuring triggers and/or behaviors for the UE to report SL buffer status on dual-mode SL LCH(s). For example, the triggers and/or behaviors may include information for how the dual-mode SL LCH(s) should include its buffer status into the BSR and/or when to send the SL BSR. For instance, in one variant, the configuring of dual-mode SL LCH(s) BSR may include configuring the buffer status of the dual-mode SL LCH to not be included in the BSR. In another variant, the configuring of dual-mode SL LCH(s) BSR may include configuring the events regarding when a dual-mode SL LCH should report its buffer status in the BSR. For example, in a variant, the reception of the BSR may be associated with the reason triggering the BSR. In some variants, the events may include one or more of the following: the channel busy ratio of the SL mode 2 is above a threshold, the data volume in the buffer is above a threshold, the packet transmission experiences a large delay, and/or a RLF is experienced from using the SL mode 2. According to a variant, the configuring of dual-mode SL LCH(s) BSR may include configuring different dual-mode SL LCHs with different events, e.g., based on their QoS requirements.

In a variant, the transmitting of the mode 1 resource allocation message may include transmitting a plurality of feasible configured MCSs to be used for the assigned resource(s) for the UE(s) among single-mode and dual-mode SL LCHs. In some variants, the configured MCSs may be indicated by using a list, a threshold, or a range. In a variant, the transmitting of the resource allocation message may also include carrying, together with the resource allocation information, an IE indicating the LCP configuration. In a variant, when a static LCP configuration has been provided, the IE can be used to indicate whether the assigned resource can be multiplexed by certain dual-mode SL LCHs or not. According to a variant, the IE can be used to indicate the LCP configuration and restriction for the dual-mode SL LCHs to use the allocated mode 1 resource.

According to a variant, the transmitting of the resource allocation message may also include indicating, in the SL grant, a rule and/or criteria for how the dual-mode SL LCHs use the SL grant of mode 1, e.g., using physical layer signaling.

In a variant, the adjusting of the network configurations may include allocating a dedicated resource for packet transmission of the dual-mode SL LCH(s). In another variant, the adjusting of the network configurations may include adjusting the configuration for the resources assigned to the corresponding single-mode SL LCH. In another variant, the adjusting of the network configurations may include modifying the LCP configuration for the dual-mode SL LCH(s) and/or reconfiguring a dual-mode SL LCH to a single-mode SL LCH. According to a variant, the method may also include transmitting the adjusted network reconfiguration to the UE(s).

Another embodiment may be directed to a method that may include receiving, by a SL UE, an indication or configuration of dual mode SL LCH(s). The method may also include transmitting at least one SL BSR that may or may not include buffer status for one or more configured dual-mode LCH(s) according to a network configuration. The method may further include receiving a SL mode 1 resource allocation message that may or may not be applied for the dual-mode LCH(s) according to the network configuration.

In a variant, the method may further include, when the dual-mode SL LCH(s) is configured, receiving a criteria or rule for selecting one of the SL mode 1 or the SL mode 2 for data transmission of the configured dual-mode SL LCH(s) and a corresponding SL BSR configuration.

According to one variant, the method may also include receiving an indication of triggers and/or events for configuring and sending a SL BSR. For instance, in a variant, the receiving may include receiving an indication that the buffer status of the dual-mode SL LCH should not be included in the BSR. In another variant, the receiving may include receiving an indication of events regarding when a dual-mode SL LCH should report its buffer status in the BSR. In some variants, the events may include one or more of the following: the channel busy ratio of the SL mode 2 is above a threshold, the data volume in the buffer is above a threshold, the packet transmission experiences a large delay, and/or a RLF is experienced from using the SL mode 2.

According to a variant, when SL grant of mode 1 is allocated, the resource allocation message may include a plurality of feasible configured MCSs to be used for the assigned resource(s) among single-mode and dual-mode SL LCHs. In some variants, the configured MCSs may be indicated by using a list, a threshold, or a range. In a variant, the receiving may also include receiving, together with the resource allocation information, an IE indicating the LCP configuration. In a variant, when a static LCP configuration has been provided, the IE may indicate whether the assigned resource can be multiplexed by certain dual-mode SL LCHs or not. According to a variant, the IE may also indicate the LCP configuration and restriction for the dual-mode SL LCHs to use the allocated mode 1 resource.

According to a variant, the method may further include, based on the received resource allocation message and the local information at the UE, selecting the proper MCS for the transmission and, based on the selected MCS, deciding whether a dual-mode SL LCH can multiplex with other single-mode SL LCH(s) into the allocated resource. In a variant, the selecting of the proper MCS may be based on different considerations, such as real-time SL CSI, the latency requirement of the data from the dual-mode SL LCHs and the SL channel sensing/measurement result, and/or based on whether the UE-selected mode 2 resource can only accommodate part of the data from the dual-mode SL LCH(s).

In a variant, the method may also include transmitting packet(s) over the assigned mode-1 resource to a peer SL UE (e.g., SL RX UE). According to a variant, if a MCS with high spectral efficiency has been selected, the transmitting may include transmitting the packet(s) over the mode-1 resource containing the data from the dual-mode SL LCH(s).

In a variant, the method may also include transmitting the triggering reason for the BSR to the NW in a separate message. In some variants, the method may also include receiving adjusted reconfiguration information from the NW. In a variant, the method may then include, based on the received reconfiguration information, reconfiguring the SL LCHs and performing the transmission accordingly.

A further embodiment is directed to an apparatus including at least one processor and at least one memory comprising computer program code. The at least one memory and computer program code may be configured, with the at least one processor, to cause the apparatus at least to perform the method according to any example embodiments discussed herein, or any of the variants described above or elsewhere herein.

A further embodiment is directed to an apparatus that may include circuitry configured to perform the method according to any example embodiments discussed herein, or any of the variants described above or elsewhere herein.

A further embodiment is directed to an apparatus that may include means for performing the method according to any of the example embodiments discussed herein, or any of the variants described above or elsewhere herein.

A further embodiment is directed to a non-transitory computer readable medium comprising program instructions stored thereon for performing at least the method according to any example embodiments discussed herein, or any of the variants described above or elsewhere herein.

BRIEF DESCRIPTION OF THE DRAWINGS

For proper understanding of example embodiments, reference should be made to the accompanying drawings, wherein.

DETAILED DESCRIPTION

Figure 1:
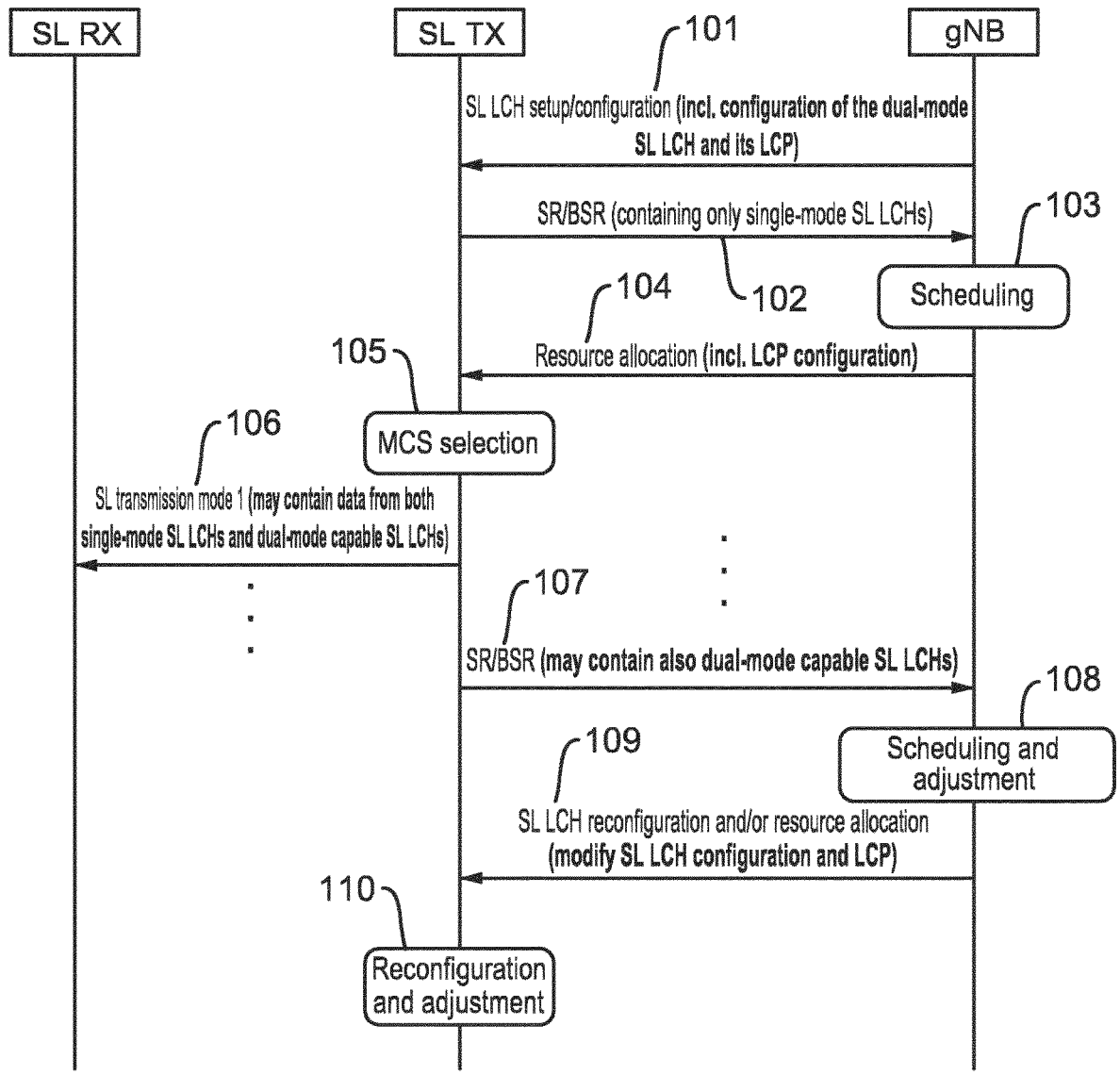
FIG. 1 illustrates an example signaling diagram, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for configuring a dual-mode SL LCH with simultaneous mode 1 and mode 2 transmission, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Currently, in 3GPP Release-16, new radio (NR) vehicle-to-anything (V2X) is under development. NR V2X is targeted to be used to serve advanced V2X services, while LTE V2X serves the basic V2X services. One difference between NR V2X and LTE V2X is that NR V2X will allow a user equipment (UE) to use simultaneous network scheduled resource allocation mode, i.e., mode 1 and UE autonomous resource allocation mode, i.e., mode 2.

In other words, NR will provide support for simultaneous configuration of mode 1 and mode 2 for a transmitter (Tx) UE to transmit sidelink (SL) communication. Receiver (Rx) UE can receive the transmissions without knowing the resource allocation mode used by the Tx UE.

However, one problem related with the simultaneous mode 1 and mode 2 is how a UE should determine which part of SL data to transmit using mode 1 or mode 2. In principle, a UE may be configured by the network (NW) to realize the simultaneous mode 1 and mode 2, for example, in one or more of the following ways. One way is that a UE could use different modes for different radio access technologies (RATs). For instance, a V2X UE might use mode 1 for its LTE SL and use mode 2 for its NR SL. Another way is that a UE could use different modes on different carriers. For example, a V2X UE may use NR mode 1 in carrier-1 since it is camping on carrier-1, while it may use NR mode 2 in carrier-2. Yet another way is that a UE could use different modes based on the operating spectrum. For instance, a V2X UE may use NR mode 1 for SL transmission on licensed spectrum, while using NR mode 2 for SL transmission on un-licensed spectrum.

However, it is assumed that it is the V2X application layer's role to select RAT or carrier and spectrum for specific V2X services. The serving radio access network (RAN) does not have much flexibility to configure the SL resource allocation mode (mode 1 or mode 2) for different RAT or carrier/spectrum band. In order to utilize the available resources of mode 1 and mode 2 to serve the targeted V2X services in a more flexible and efficient way, a quality-of-service (QoS) flow-based or SL logical channel (LCH)-based mode selection approach may be desirable. Under this approach, a V2X or sidelink transmitter (TX) UE can use different modes for the same or different SL LCHs, e.g., as one example, NR mode 1 could be used for the SL LCH 1, NR mode 2 could be used for SL LCH 2, and/or mode 1 & 2 could be used for SL LCH3. In this manner, mode selection for different SL LCH may be under the control of access stratum level depending on the real-time SL channel and resource availability conditions.

In case that a SL LCH is configured to support one single-mode (e.g., mode 1 or mode 2), the QoS requirements (e.g., latency or reliability) of the configured single-mode SL LCH should be fulfilled by one single-mode configuration in a semi-static way as the reconfiguration of resource allocation mode for the single-mode SL LCH is signaled via radio resource control (RRC) signaling or the policy for reconfiguration may be pre-configured at the device.

As the SL channel and resource availability in different resource allocation modes (mode 1 or mode 2) may change dynamically, it might not be quick enough to adapt single-mode SL LCHs configuration using RRC signalling to the dynamic change of SL channel conditions and resource availability. Hence, certain embodiments described herein provide dual-mode SL LCH(s), which may outperform single-mode SL LCH in at least the following example scenarios. For instance, if the traffic load in the configured mode is higher than that of the other mode, configuring one SL LCH to a single-mode SL LCH will pose unnecessary limitations and prevent that SL LCH from using the resources of the other mode. Also, if a single-mode SL LCH is configured to use only SL mode 2, a UE selects the transmission resources based on its channel sensing/measurement results. Thus, if the UE-sensing result shows that the next available transmission opportunity in mode 2 is at a time instance that leads to packet delay budget expiry, staying with mode 2 only would no longer be proper.

For a SL LCH configured with SL mode 1, the UE will request for transmission resources from the NW. However, if the UE in mode 1 does not transmit its SL channel status information (CSI) to the NW, the NW may not be able to properly determine the amount of allocated resources that can accurately reflect the requested transmission block size based on, e.g., SL buffer status report (BSR). For example, if the SL channel is in good condition and allows the UE to use a modulation and coding scheme (MCS) with high spectral efficiency, the resource size for real SL transmission could be smaller than the allocated resource size. Thus, a part of the resource may be wasted. As one example, this problem may at least be particularly relevant when the resource allocation is a configured grant (CG) or a semi-persistent-scheduling (SPS) type, since the SL channel condition can vary from time to time and the NW is not aware of the real-time channel condition variations.

In LTE V2X, a UE is only allowed to perform SL communication by using one single-mode, i.e., either network scheduled resource allocation mode or UE autonomous resource allocation mode. Thus, a UE in RRC IDLE state applies LTE SL UE autonomous resource allocation mode for transmitting all the V2X packets. A UE in RRC CONNECTED state can be configured by the network to use either network scheduled resource allocation mode or UE autonomous resource allocation mode for transmitting its V2X packets. In principle, one single-mode is used in an LTE V2X UE to serve all the packets, irrespective of the packet priority and the delay budget.

For NR V2X, a single-mode (i.e., NR SL mode 1 or NR SL mode 2) may be configured to a SL LCH/SL logical channel group (LCG)/SL radio bearer (RB) in the UE. In this case, one SL LCH/SL LCG/SL RB would be mapped to a single SL mode, taking account of the QoS requirements of the SL LCH/SL LCG/SL RB and the performance of each SL mode. For instance, if the SL LCH/SL LCG/SL RB requires an ultra-low latency, the NR SL mode 2 (i.e., UE-autonomous resource selection/allocation mode) might be selected, since the NR SL mode 1 (i.e., NW-scheduled resource allocation mode) requires additional signaling and latency for the UE to request the transmission resource from network. Thus, if NR SL mode 1 is used, the additional signaling for resource request and allocation introduces additional latency. On the other hand, the SL LCH/SL LCG/SL RB requiring an ultra-high reliability may select the NR SL mode 1, since the NW-scheduled resource allocation mode (i.e., mode 1) can reduce the packet collision rate and provides a better reliability than the UE-autonomous resource selection mode (i.e., mode 2).

As discussed herein, some embodiments may assume that each SL LCH in a V2X TX UE can be configured with its SL resource allocation mode, based on its QoS requirement. From among the SL LCHs, some may be configured to support one single-mode (mode 1 or mode 2), while others may be configured to be dual-mode SL LCHs (mode 1 and mode 2).

In one embodiment, a packet-level mode selection may be configured and applied for the dual-mode SL LCHs. For example, according to an embodiment, when dual-mode SL LCH is configured, the NW may configure a UE with the criteria on selecting mode 1 and/or mode 2 for buffered data transmission of the configured dual-mode SL LCH and corresponding SL-buffer status report (BSR) related configuration.

According to certain embodiments, the NW may configure the rule and/or criteria regarding how the dual-mode SL LCH may use the SL grant of mode 1. For example, the maximum/minimum number of bits may be configured for the dual-mode LCH to set as the limitation on use of SL grant of mode 1 or the other way around to set as the limitation on usage of mode 2 resource allocation and the rest may be set to use the SL grant of mode 2/1. As another example, a set of maximum/minimum number of bits may be configured, of which each may correspond to different mode 2 resource pool conditions (e.g., different channel busy ratio (CBR) thresholds of mode 2 resource pool). As yet another example, the number of bits of dual-mode SL LCH that can use SL grant of mode 1 may be associated with the buffer size reported by the UE in the SL BSR, as will be discussed below.

Further, in an embodiment, the NW may configure a dual-mode SL LCH with two sets of logical channel prioritization (LCP) configurations, in which one LCP configuration may be related to mode 1 and another LCP configuration may be related to mode 2. Then, when buffered data in dual-mode SL LCH are multiplexed into a MAC packet data unit (PDU)/transmission block (TB) using SL grant of mode 1, the LCP configuration related to mode 1 should be applied in this example. Similarly, in this example, the same may apply for LCP configuration related to mode 2.

According to an embodiment, the NW may configure new triggers and UE behaviors on sending SL BSR of the dual-mode SL LCHs. For instance, the NW may configure the dual-mode SL LCH to include its buffered data volume in SL BSR if the amount of data in dual-mode SL LCH is larger than the configured threshold, which may depend on the CBR of mode 2 resource pool.

According to some embodiments, when SL grant of mode 1 (e.g., it can be either dynamic or semi-persistent resource (s)) is allocated to the UE, the NW may configure multiple MCSs (i.e., which can accommodate different maximal TB sizes) for using the assigned resource for the UE among single-mode and dual-mode SL LCHs. Among the configured MCSs, there may be at least one of the MCSs and corresponding TB sizes that can accommodate the reported amount of data of single-mode LCHs and at least part of dual-mode LCHs' data. This gives the flexibility for the UE to form the SL MAC PDU/TB based on SL CSI, mode 2 resource pool condition as well as the data amount in each SL LCH buffer, as discussed below.

In a further embodiment, when SL grant of mode 1 is allocated, in the SL grant, the NW may also indicate the rule and/or criteria regarding how the dual-mode SL LCHs may use the SL grant of mode 1 using physical layer signaling (such as in downlink control information (DCI) of physical downlink control channel (PDCCH)) as one option. Alternatively, as another option, all the dual-mode SL LCHs related configurations as provided above may be configured using the RRC signaling in either broadcast way (e.g., using broadcasted system information) or dedicated way (e.g., using dedicated RRC signaling).

According to certain embodiments, upon receiving the SL grant of mode 1, the SL TX UE may select the proper MCS from the configured set of feasible MCSs to form the MAC PDU/TB according to the configuration from NW. The selection of the MCS can be based on different considerations according to the NW configuration, such as real-time SL CSI, latency requirement of the data from the dual-mode SL LCH(s), and/or the SL channel sensing/measurement result, in order to achieve the reliability and/or latency requirements.

In an embodiment, the SL TX UE may select an MCS with high spectral efficiency if SL CSI indicates good channel condition. In this case, the SL grant of mode 1 should be able to accommodate the data from the both single-mode SL LCH(s) and dual-mode SL LCH(s), which were configured by NW.

According to an embodiment, the SL Tx UE may select an MCS with higher spectral efficiency in order to accommodate data from dual-mode SL LCHs in addition to single-mode SL LCHs, if mode 2 resource pool is congested (e.g., CBR is higher than configured threshold) and/or the selected mode 2 resource introduces an intolerable delay.

In one embodiment, the SL TX UE may select a proper MCS with suitable TB size to accommodate the remaining data of dual-mode SL LCHs after mode 2 resources for dual-mode SL LCHs were selected. In this case, dual-mode SL LCHs may use mode 2 resources to transmit its data if mode 2 resource pool is sufficient.

According to some embodiments, upon the reception of a BSR containing one or multiple dual-mode SL LCHs, the NW can adjust its configuration accordingly. For example, the NW may allocate dedicated resource for the dual-mode SL LCH(s), may adjust the configuration for the resources assigned to the corresponding single-mode SL LCH, e.g., decreasing the list of the associated dual-mode SL LCHs or increasing the size of the future allocated resources, and/or may reconfigure a dual-mode SL LCH to a single-mode SL LCH.

It should be noted that SL LCH is used herein as one example for illustration, and that example embodiments may be also applicable to SL LCG or SL RB, which may depend on the resource allocation granularity or the SL mode selection granularity in the system. As such, in certain embodiments, SL LCH as used herein may be replaced by SL LCG or SL RB, for example.

FIG. 1 illustrates an example of a signaling diagram, according to certain embodiments. As illustrated in the example of FIG. 1, at 101, during (re)configuration of the SL LCH, the NW may configure the SL TX UE regarding whether the SL LCH is a single-mode SL LCH or the SL LCH is a dual-mode SL LCH. It is noted that the configuration of the operating mode for a SL LCH may depend on the real-time NW conditions and the QoS requirements of the considered SL LCH. For instance, if the performance on a specific mode is becoming worse or unsatisfactory, a single-mode SL LCH may be reconfigured to another mode or dual-mode SL LCH, or a dual-mode SL LCH may be reconfigured to a single-mode SL LCH. On the other hand, if the performances of both modes are sufficient to meet the target QoS, a single-mode SL LCH may be reconfigured to a dual-mode SL LCH.

In addition, according to some embodiments, the NW may also configure each dual-mode SL LCH with two sets of LCP configurations, i.e., one LCP configuration for mode 1 operation and the other LCP configuration for mode 2 operation. For example, the LCP configuration for mode 1 may indicate how the data from the dual-mode SL LCH should be multiplexed with the data from other SL LCH(s) by using the mode 1 resource. It is noted that the LCP configuration for mode 1 may also be applied when the SL TX UE constructs its SL BSR. Meanwhile, the LCP configuration for mode 2 may show the policy regarding the priority on multiplexing the data from the dual-mode SL LCH and the data from other SL LCH(s) by using the mode-2 resource.

It is noted that the above LCP configuration may lead to a semi-static setting if the configuration is performed via RRC signaling, since the configuration is foreseen to change infrequently using RRC signaling. Alternatively, instead of using RRC signaling for the semi-static configuration, another embodiment may dynamically configure the multiplexing rule for the dual-mode SL LCHs using physical layer signaling together with SL resource allocation command (e.g. using DCI in PDCCH), as shown in procedure 4 discussed below.

It is also noted that the resource mentioned herein can be either dynamically allocated or periodically allocated, e.g., by SPS or CG. In addition, the NW may also restrict some SL LCHs with ultra-high reliability and/or ultra-low latency requirements from sharing the same resource with the other dual-mode SL LCHs.

Further, in an embodiment, the NW may configure the rule regarding how the dual-mode SL LCHs should use the configured resource. According to one example embodiment, the NW may set the data volume limitation for each dual-mode SL LCH to use the configured resource. For instance, the maximum/minimum number of bits may be configured for the dual-mode LCH as the limitation for using SL mode 1 grant, or the other way around to set the maximum/minimum number of bits as the limitation on the usage of mode 2 resource allocation and the rest may be set to use the SL grant of mode 2/1. In another example embodiment, the NW may configure a set of data volume limitations for a dual-mode SL LCH to use the configured resource. In this case, the SL TX UE may need to select a particular limitation based on its local condition(s), e.g., CBR and/or buffer status. For instance, different maximum/minimum numbers of bits may correspond to different mode 2 resource pool conditions (e.g., by using different CBR thresholds of mode 2 resource pool). Alternatively, the maximum/minimum number of the bits of the dual-mode SL LCH that can use SL grant of mode 1 may be associated with the data size in the buffer.

Moreover, in an embodiment, the NW may configure when and how the dual-mode SL LCHs should include their buffer status into the SL BSR. In one example, the buffer status of the dual-mode SL LCH can be configured to not be included in the SL BSR. In this case, the NW is not aware whether the corresponding SL LCH has data to transmit or not. The dual-mode SL LCH may use the SL mode 1 if its buffered data can be multiplexed into the MAC PDU/transport block according to the scheduled resources by the NW and configured LCP. This approach may apply for those dual-mode SL LCHs that do not have a strict QoS requirement. Alternatively, in an embodiment, the NW may configure the events regarding when a dual-mode SL LCH should report its buffer status in the SL BSR. The transmission of the SL BSR may indicate the reason triggering the BSR, which can help the NW to react properly. For instance, the triggers may include one or more of the following: the channel busy ratio of the SL mode 2 is above a threshold, the data volume in the buffer is above a threshold, the packet transmission experiences a large delay, and/or a radio link failure (RLF) is experienced from using the SL mode 2.

Further, in an embodiment, different dual-mode SL LCHs may be configured with different events, based on their QoS requirements. For instance, a dual-mode SL LCH requiring a low reliability can be configured with a high CBR threshold to trigger the SL BSR. As another example, a dual-mode SL LCH with a low packet delay budget can be configured with a low threshold for the data volume in the buffer to trigger the BSR. Therefore, the NW can be notified and make the corresponding adjustment for this SL LCH in a timely manner.

As further illustrated in the example of FIG. 1, at 102, based on the NW configuration from procedure 101, the SL TX UE may send the SL BSR containing only the single-mode SL LCHs in mode 1 to the gNB, if the BSR of the dual-mode SL LCHs has not been triggered.

In an embodiment, based on the received SL BSR, at 103, the gNB/NW may perform the scheduling algorithm and allocate resources to SL TX UE to use allocated mode 1 for SL data transmission. As shown in the example of FIG. 1, at 104, the gNB may send its resource allocation message to the SL TX, and the resource can be either dynamic or semi-persistent resources. This message may also contain the feasible MCSs to be used for the assigned resource(s), which can be indicated by using a list, a threshold, or a range. By using different MCSs with different spectral efficiency, the maximal TB size derived from the allocated resource may be different. Together with the resource allocation information, an information element (IE) indicating the LCP configuration may be carried. In an embodiment, if the semi-static LCP configuration has been provided at procedure 101 of FIG. 1 using, e.g., RRC signaling, the IE can be used to indicate whether the assigned resource can be multiplexed by certain dual-mode SL LCHs or not. In this manner, the NW preserves the flexibility to restrain certain dual-mode SL LCH(s) from using certain configured mode-1 resources. According to one embodiment, the IE can be used to indicate the LCP configuration and restriction for the dual-mode SL LCHs to use the allocated mode 1 resource. In this approach, the LCP configuration and restriction may apply just for this assigned resource, or it may apply until another IE deactivates it. In this embodiment, the NW is able to dynamically adjust the LCP configuration of the dual-mode SL LCH for each assigned resource.

As further illustrated in the example of FIG. 1, at 105, based on the received resource allocation message and the local information at the SL TX UE (e.g., SL CSI and SL channel sensing/measurement result), the SL TX UE may select the proper MCS for the transmission. Based on the selected MCS, the SL TX UE can decide whether a dual-mode SL LCH can use the allocated resource together with other single-mode SL LCH(s).

In an embodiment, if the SL TX selects an MCS with high spectral efficiency, the SL TX can use the assigned resource to accommodate the data from the both single-mode SL LCH(s) and the dual-mode SL LCH(s) according to the configuration from the NW. According to some embodiments, the selection of the proper MCS can be based on different considerations. For example, the selection of the proper MCS may be based on real-time SL CSI, in order to select a MCS with good spectral efficiency and robustness. This option may be particularly relevant for the cases where SL CSI is available at the SL TX UE, e.g., in SL unicast and groupcast. As another example, the selection of the proper MCS may be based on latency requirement of the data from the dual-mode SL LCHs and the SL channel sensing/measurement result. For instance, if the data in a dual-mode SL LCH is going to expire its packet delay budget and the next UE-autonomous selected resource from mode 2 resource pool will introduce a large delay, the SL TX UE may decide to select a MCS with a high spectral efficiency in the configured resource to carry the data from both the single-mode SL LCH(s) and the dual-mode SL LCH(s). This option may be particularly relevant for the cases where SL CSI is not available at the SL TX UE (e.g., SL broadcast) and/or the QoS requirement of the single-mode SL LCH(s) can tolerate certain performance degradation. As yet another example, if the UE-selected mode 2 resource can only accommodate part of the data from the dual-mode SL LCH(s), an MCS with high spectral efficiency can be selected to carry both the data from the single-mode SL LCH(s) and also the rest of the data from the dual-mode SL LCH(s).

As also illustrated in the example of FIG. 1, at 106, the SL TX UE may transmit its packet over the assigned mode-1 resource to its peer SL RX UE. As mentioned above, if a MCS with high spectral efficiency has been selected in procedure 105, the transmitted packet over the mode-1 resource can contain the data from the dual-mode SL LCH(s). At 107, if one of the configured triggers for BSR based on the configuration performed at procedure 101 is detected, the SL TX UE may include the buffer status from one or multiple dual-mode SL LCH(s) into the SL BSR. In addition, the triggering reason may also be sent to the NW in a same or separate message.

As depicted in the example of FIG. 1, at 108, upon the reception of a BSR containing the dual-mode SL LCH(s), the NW can adjust its configuration accordingly. For example, the NW may allocate dedicated resource for packet transmission of the dual-mode SL LCH(s), in order to help their buffered data to be transmitted quickly. As another example, the NW may adjust the configuration for the resources assigned to the corresponding single-mode SL LCH. For instance, the NW may restrict one or more dual-mode SL LCHs from using mode 1 resource. Thus, there is less competition for the rest dual-mode SL LCH(s) to obtain a change to transmit over the scheduled mode 1 resources. Alternatively, the NW can also increase the size of the future scheduled mode 1 resources for the corresponding single-mode SL LCH(s) and/or relevant dual-mode SL LCH(s). In some other examples, the NW may modify the LCP configuration for the dual-mode SL LCH(s), and/or may reconfigure a dual-mode SL LCH to a single-mode SL LCH.

As further illustrated in the example of FIG. 1, at 109, the gNB may send its adjusted reconfiguration to the SL TX UE. Then, at 110, based on received reconfiguration information, the SL TX UE may reconfigure its SL LCHs and perform the transmission accordingly. According to certain embodiments, the procedures of FIG. 1 may be repeated.

Figure 2A:
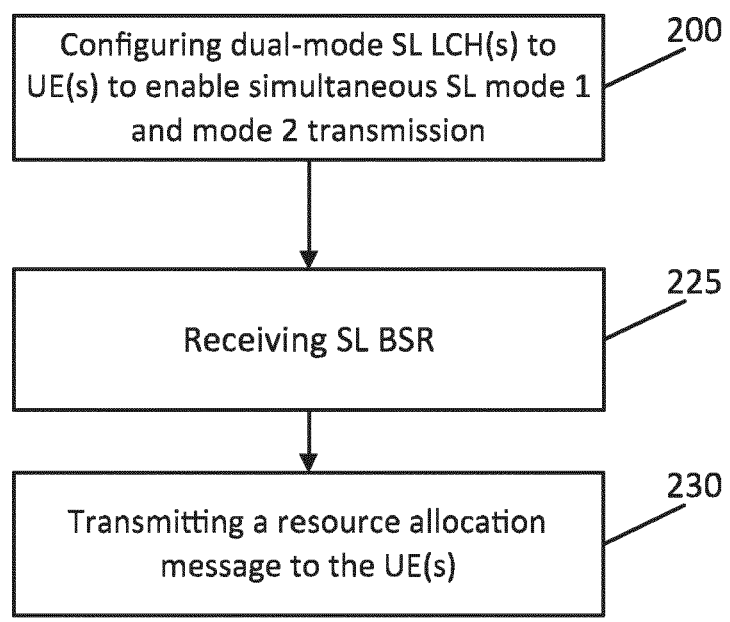
FIG. 2a illustrates an example flow diagram of a method, according to an embodiment.

FIG. 2a illustrates an example flow diagram of a method for configuring and/or applying a packet-level mode selection for dual-mode SL LCHs, according to one example embodiment. In certain example embodiments, the flow diagram of FIG. 2a may be performed by a NW entity or NW node in a communication system, such as LTE or 5G NR. For instance, in some example embodiments, the NW node performing the method of FIG. 2a may include a base station, eNB, gNB, and/or NG-RAN node.

As illustrated in the example of FIG. 2a, the method may include, at 200, configuring dual-mode LCH(s) to one or more UE(s) (e.g., a SL TX UE) to enable simultaneous SL mode 1 and SL mode 2 transmission. In some embodiments, whether the operating mode for a SL LCH is single-mode or dual-mode may depend on the real-time NW conditions and the QoS requirements of the SL LCH. For example, when the performance on a specific mode is becoming worse or degraded, a single-mode SL LCH may be reconfigured to another mode or a dual-mode SL LCH may be reconfigured to a single-mode SL LCH. On the other hand, when the performances of both modes are sufficient to meet the target QoS, a single-mode SL LCH may be reconfigured as a dual-mode SL LCH.

In one embodiment, configuring 200 may include configuring each dual-mode SL LCH(s) with two sets of LCP configurations, where one LCP configuration is for mode 1 operation and the other LCP configuration is for mode 2 operation. According to an embodiment, the LCP configuration for mode 1 may indicate how the data from the dual-mode SL LCH(s) should be multiplexed with the data from other SL LCH(s) by using the mode 1 resource. In one example, the LCP configuration for mode 1 may also be applied when the SL TX UE constructs its BSR. According to an embodiment, the LCP configuration for mode 2 may indicate the policy regarding how the data from the dual-mode SL LCH(s) should be multiplexed with the data from other SL LCH(s) by using the mode-2 resource.

According to an embodiment, the configuring 200 may further include configuring the UE(s) with a criteria or rule for selecting one of the SL mode 1 or the SL mode 2 for data transmission of the configured dual-mode SL LCH(s) and a corresponding SL BSR configuration.

In an embodiment, the configuring 200 may also include configuring a rule or criteria regarding how the dual-mode SL LCH(s) uses the configured resource (e.g., the SL grant of mode 1). For example, in one embodiment, the configuring of a rule or criteria may include configuring the maximum and/or minimum number of bits for the dual-mode SL LCH(s) to set as the limitation on usage of SL grant of mode 1 or to set as the limitation on usage of SL mode 2, where the remaining bits may be set to use for SL grant of the other operating mode. In another embodiment, the configuring of a rule or criteria may include configuring a set of maximum and/or minimum number of bits, where each set corresponds to different mode 2 resource pool conditions. According to another embodiment, the configuring of a rule or criteria may include associating the number of bits of dual-mode SL LCH(s) that can use SL grant of mode 1 with the buffer size reported by the UE in the SL BSR, which may be received as discussed below.

According to one embodiment, the configuring 200 may also include configuring triggers and/or behaviors for the UE to report SL buffer status on dual-mode SL LCH(s), for example, for how the dual-mode SL LCH(s) should include its buffer status into the BSR and/or when to send the SL BSR. For instance, in one embodiment, the configuring of the triggers and/or behaviors of dual-mode SL LCH(s) BSR may include configuring the buffer status of the dual-mode SL LCH to not be included in the BSR. In this case, the NW would not be aware of whether the corresponding SL LCH has data to transmit and the dual-mode SL LCH may only use the SL mode 1 by multiplexing into the configured resources acquired by the NW-associated single-mode SL LCH(s). In another embodiment, the configuring of the triggers and/or behaviors of dual-mode SL LCH(s) SL BSR may include configuring the events regarding when a dual-mode SL LCH should report its buffer status in the BSR. For example, the transmission of the BSR may be associated with the reason triggering the BSR, which can help the NW to react properly. In some embodiments, the events may include one or more of the following: the channel busy ratio of the SL mode 2 is above a threshold, the data volume in the buffer is above a threshold, the packet transmission experiences a large delay, and/or a RLF is experienced from using the SL mode 2. According to an embodiment, the configuring of the triggers and/or behaviors of dual-mode SL LCH(s) SL BSR may include configuring different dual-mode SL LCHs with different events, based on their QoS requirements. For instance, a dual-mode SL LCH requiring a low reliability can be configured with a relatively high CBR threshold to trigger the BSR. As another example, a dual-mode SL LCH with a low packet delay budget can be configured with a low threshold for the data volume in the buffer to trigger the BSR. As a result, the NW can be notified and make the corresponding adjustment for this SL LCH in a timely manner.

In certain embodiments, the method of FIG. 2a may also include, at 225, receiving at least one SL BSR that may or may not contain buffer status for one or more configured dual-mode SL LCH(s) according to NW configuration. According to some embodiments, the method may optionally include adjusting NW configurations accordingly based on the at least one received BSR.

According to some embodiments, the method of FIG. 2a may also include, at 230, transmitting a SL mode 1 resource allocation message to the UE(s), where the mode 1 resource allocation may or may not be applied for the dual-mode LCHs according to NW configuration. According to one embodiment, the transmitting 230 of a SL mode 1 resource allocation message may include a plurality of feasible configured MCSs to be used for the assigned resource(s) for the UE(s) among single-mode and dual-mode SL LCHs. In some embodiments, the configured MCSs may be indicated by using a list, a threshold, or a range. By using different MCSs with different spectral efficiency, the maximal TB size that can be carried in the allocated resource(s) can be different. In an embodiment, the transmitting 230 may also include carrying, together with the resource allocation information, an IE indicating the LCP configuration. In an embodiment, when a static LCP configuration has been provided, the IE can be used to indicate whether the assigned resource can be multiplexed by certain dual-mode SL LCHs or not. In this manner, the NW can preserve the flexibility to restrain certain dual-mode SL LCH(s) from using certain configured mode-1 resource(s). According to one embodiment, the IE can be used to indicate the LCP configuration and restriction for the dual-mode SL LCHs to use the allocated mode 1 resource. In this embodiment, the LCP configuration and restriction may only apply for this assigned resource, or it may apply until another IE deactivates it. As such, the NW is able to dynamically adjust the LCP configuration of the dual-mode SL LCH for each assigned resource.

According to an embodiment, the transmitting 230 may also include indicating, in the SL grant, a rule and/or criteria for how the dual-mode SL LCHs use the SL grant of mode 1, e.g., using physical layer signaling rather than using RRC signaling.

In an embodiment, the NW configurations may be adjusted by allocating a dedicated resource for packet transmission of the dual-mode SL LCH(s), in order to help their buffered data to be transmitted quickly. In another embodiment, the NW configurations may be adjusted by adjusting the configuration for the resources assigned to the corresponding single-mode SL LCH. For instance, the NW may restrict a dual-mode SL LCH from the list of the dual-mode SL LCHs that can be multiplexed into the same configured resource. Alternatively, the NW can also increase the size of the future configured resources for the corresponding single-mode SL LCH. In another embodiment, the NW configurations may be adjusted by modifying the LCP configuration for the dual-mode SL LCH(s) and/or by reconfiguring a dual-mode SL LCH to a single-mode SL LCH. According to certain embodiments, if NW configuration has been adjusted, the method of FIG. 2a may optionally also include sending the adjusted NW reconfiguration to the UE(s).

Figure 2B:
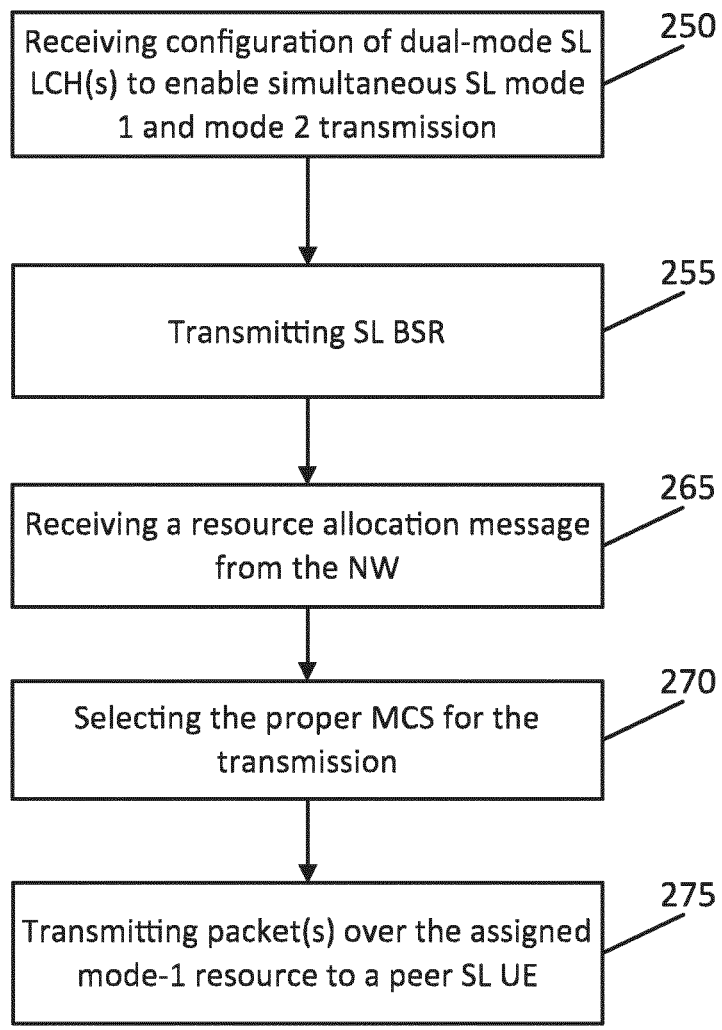
FIG. 2b illustrates an example flow diagram of a method, according to an embodiment.

FIG. 2b illustrates an example flow diagram of a method for configuring and/or applying a packet-level mode selection for dual-mode SL LCHs, according to one example embodiment. In certain example embodiments, the flow diagram of FIG. 2b may be performed by a NW entity or NW node in a communications system, such as LTE or 5G NR. For instance, in some example embodiments, the network entity performing the method of FIG. 2b may be a UE, such as a SL UE (e.g., SL TX UE), mobile station, IoT device, or the like.

In an embodiment, the method of FIG. 2b may include, at 250, during configuration or reconfiguration of a SL LCH, receiving an indication or configuration of dual-mode LCH(s). According to one embodiment, the receiving 250 may further include, when the dual-mode SL LCH(s) is configured, receiving a criteria or rule for selecting one of the SL mode 1 or the SL mode 2 for data transmission of the configured dual-mode SL LCH(s) and a corresponding SL BSR configuration.

According to one embodiment, the receiving 250 may include receiving an indication of triggers and/or events for configuring and sending a SL BSR. For instance, in one embodiment, the receiving 250 may include receiving an indication that the buffer status of the dual-mode SL LCH should not be included in the BSR. In another embodiment, the receiving 250 may include receiving an indication of events regarding when a dual-mode SL LCH should report its buffer status in the BSR. In an embodiment, the events may include one or more of the following: the channel busy ratio of the SL mode 2 is above a threshold, the data volume in the buffer is above a threshold, the packet transmission experiences a large delay, and/or a RLF is experienced from using the SL mode 2.

In certain embodiments, when at least one of the configured triggers for transmitting BSR is detected, the method may include, at 255, transmitting at least one SL BSR that may or may not contain buffer status for one or more configured dual-mode SL LCH(s) according to NW configuration. In an embodiment, the method may also include transmitting the triggering reason to the NW in a separate message.

According to some embodiments, the method of FIG. 2b may also include, at 265, receiving a SL mode 1 resource allocation message from the NW, where the mode 1 resource allocation may or may not be applied for the dual-mode LCH(s) according to NW configuration. When SL grant of mode 1 is allocated, the resource allocation message may include a plurality of feasible configured MCSs to be used for the assigned resource(s) among single-mode and dual-mode SL LCHs. In some embodiments, the configured MCSs may be indicated by using a list, a threshold, or a range. In an embodiment, the receiving 265 may also include receiving, together with the resource allocation information, an IE indicating the LCP configuration. In an embodiment, when a static LCP configuration has been provided, the IE may indicate whether the assigned resource can be multiplexed by certain dual-mode SL LCHs or not. According to one embodiment, the IE may also be used to indicate the LCP configuration and restriction for the dual-mode SL LCHs to use the allocated mode 1 resource. In this embodiment, the LCP configuration and restriction may only apply for this assigned resource, or it may apply until another IE deactivates it.

According to some embodiments, the method of FIG. 2b may further include, at 270, based on the received resource allocation message and the local information at the UE, selecting the proper MCS for the transmission and, based on the selected MCS, deciding whether a dual-mode SL LCH can multiplex with other single-mode SL LCH(s) into the allocated resource. For example, when an MCS with high spectral efficiency is selected, the method may include using the assigned resource to accommodate the data from the both single-mode SL LCH(s) and the dual-mode SL LCH(s), which were configured by the NW. In an embodiment, the selecting 270 of the proper MCS may be based on different considerations, such as real-time SL CSI, the latency requirement of the data from the dual-mode SL LCHs and the SL channel sensing/measurement result, and/or based on whether the UE-selected mode 2 resource can only accommodate part of the data from the dual-mode SL LCH(s). In the latter case, an MCS with high spectral efficiency may be selected to carry both the data from the single-mode SL LCH(s) and also the rest of the data from the dual-mode SL LCH(s).

In an embodiment, the method of FIG. 2b may also include, at 275, transmitting packet(s) over the assigned mode-1 resource to a peer SL UE (e.g., SL RX UE). According to one embodiment, if a MCS with high spectral efficiency has been selected at 270, the transmitting 275 may include transmitting the packet(s) over the mode-1 resource containing the data from the dual-mode SL LCH(s).

In certain embodiments, the method may also include receiving adjusted reconfiguration information from the NW and, based on the received reconfiguration information, reconfiguring the SL LCHs and performing the transmission accordingly.

Figure 3A:
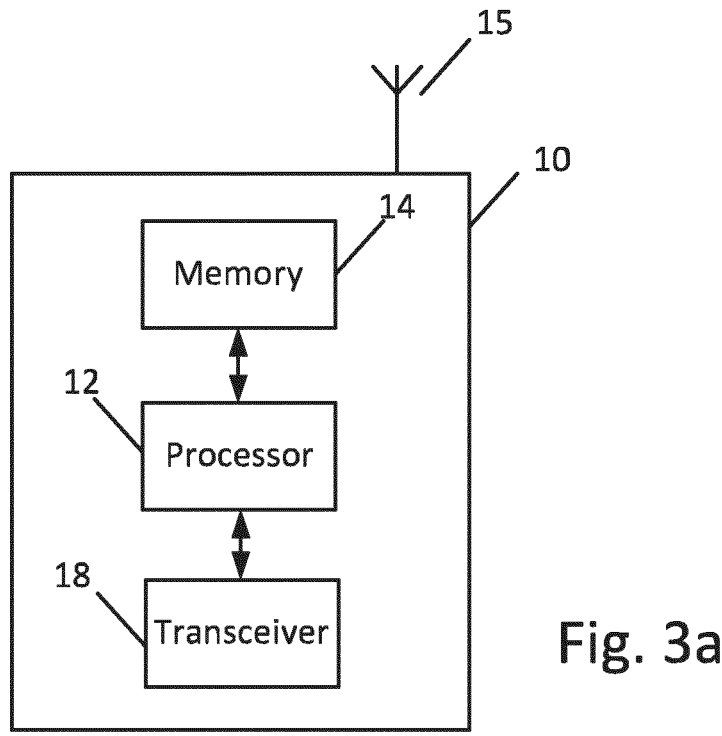
FIG. 3a illustrates an example block diagram of an apparatus, according to an embodiment.

FIG. 3a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be NG-RAN node, an eNB in LTE, or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 3a.

As illustrated in the example of FIG. 3a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 3a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may foil a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a NW node or RAN node, such as a base station, access point, Node B, eNB, gNB, WLAN access point, or the like. In another example, in some embodiments, apparatus 10 may include a SL UE that perform SL transmission to SL RX UE.

According to certain embodiments, apparatus 10 may be controlled by memory 14 and processor 12 to perform the functions associated with any of the example embodiments described herein, such as the flow or signaling diagrams illustrated in FIG. 1, 2a or 2b. In some embodiments, apparatus 10 may be configured to perform a procedure for configuring and/or applying mode selection for dual-mode SL LCHs. In an embodiment, apparatus 10 may represent a network node, such as a base station, eNB, gNB or NG-RAN node, or may represent a UE, such as a SL UE.

In an embodiment, apparatus 10 may be controlled by memory 14 and processor 12 to configure dual-mode LCH(s) to one or more UE(s) (e.g., a SL TX UE) to enable simultaneous SL mode 1 and SL mode 2 transmission. In some embodiments, whether the operating mode for a SL LCH is configured as single-mode or dual-mode may depend on the real-time NW conditions and the QoS requirements of the SL LCH. For example, when the performance on a specific mode worsens or degrades, apparatus 10 may be controlled by memory 14 and processor 12 to reconfigure a single-mode SL LCH to another mode or to reconfigure a dual-mode SL LCH to a single-mode SL LCH. On the other hand, when the performances of both modes are sufficient to meet the target QoS, apparatus 10 may be controlled by memory 14 and processor 12 to reconfigure a single-mode SL LCH as a dual-mode SL LCH.

In one embodiment, apparatus 10 may be controlled by memory 14 and processor 12 to configure each dual-mode SL LCH(s) with two sets of LCP configurations, where one LCP configuration is for mode 1 operation and the other LCP configuration is for mode 2 operation. According to an embodiment, the LCP configuration for mode 1 may indicate how the data from the dual-mode SL LCH(s) should be multiplexed with the data from other SL LCH(s) by using the mode 1 resource. In one example, the LCP configuration for mode 1 may also be applied when the SL TX UE constructs its SL BSR. According to an embodiment, the LCP configuration for mode 2 may indicate the policy regarding how the data from the dual-mode SL LCH(s) should be multiplexed with the data from other SL LCH(s) by using the mode-2 resource.

According to an embodiment, apparatus 10 may be controlled by memory 14 and processor 12 to configure the UE(s) with a criteria or rule for selecting one of the SL mode 1 or the SL mode 2 for data transmission of the configured dual-mode SL LCH(s) and a corresponding SL BSR configuration.

In an embodiment, apparatus 10 may be controlled by memory 14 and processor 12 to configure a rule or criteria regarding how the dual-mode SL LCH(s) uses the configured resource (e.g., the SL grant of mode 1). For example, in one embodiment, apparatus 10 may be controlled by memory 14 and processor 12 to configure the maximum and/or minimum number of bits for the dual-mode SL LCH(s) to set as the limitation on usage of SL grant of mode 1 or to set as the limitation on usage of SL mode 2, where the remaining bits may be set to use for SL grant of the other operating mode. In another embodiment, apparatus 10 may be controlled by memory 14 and processor 12 to configure a set of maximum and/or minimum number of bits, where each set corresponds to different mode 2 resource pool conditions. According to another embodiment, apparatus 10 may be controlled by memory 14 and processor 12 to associate the number of bits of dual-mode SL LCH(s) that can use SL grant of mode 1 with the buffer size reported by the UE in the SL BSR.

According to one embodiment, apparatus 10 may be controlled by memory 14 and processor 12 to configure triggers and/or behaviors, for example, for how the dual-mode SL LCH(s) should include its buffer status into the BSR and/or when to send the SL BSR. For instance, in one embodiment, apparatus 10 may be controlled by memory 14 and processor 12 to configure the buffer status of the dual-mode SL LCH to not be included in the BSR. In this case, apparatus 10 would not be aware of whether the corresponding SL LCH has data to transmit and the dual-mode SL LCH may only use the SL mode 1 by multiplexing into the configured resources acquired by the NW-associated single-mode SL LCH(s). In another embodiment, apparatus 10 may be controlled by memory 14 and processor 12 to configure the events regarding when a dual-mode SL LCH should report its buffer status in the BSR. For example, the transmission of the BSR may be associated with the reason triggering the BSR, which can help apparatus 10 to react appropriately. In some embodiments, the events may include one or more of the following: the channel busy ratio of the SL mode 2 is above a threshold, the data volume in the buffer is above a threshold, the packet transmission experiences a large delay, and/or a RLF is experienced from using the SL mode 2. According to an embodiment, apparatus 10 may be controlled by memory 14 and processor 12 to configure different dual-mode SL LCHs with different events, based on their QoS requirements. For instance, a dual-mode SL LCH requiring a low reliability can be configured with a relatively high CBR threshold to trigger the BSR. As another example, a dual-mode SL LCH with a low packet delay budget can be configured with a low threshold for the data volume in the buffer to trigger the BSR. As a result, apparatus 10 can be notified and make the corresponding adjustment for this SL LCH in a timely manner.

In certain embodiments, apparatus 10 may be controlled by memory 14 and processor 12 to receive at least one SL BSR that may or may not contain buffer status for one or more configured dual-mode SL LCH(s) according to NW configuration. According to some embodiments, apparatus 10 may be controlled by memory 14 and processor 12 to adjust NW configurations accordingly based on the at least one received BSR.

According to some embodiments, apparatus 10 may be controlled by memory 14 and processor 12 to transmit a SL mode 1 resource allocation message to the UE(s), where the mode 1 resource allocation may or may not be applied for the dual-mode LCH(s) according to NW configuration. When SL grant of mode 1 is allocated to the UE(s), the resource allocation message may include a plurality of feasible configured MCSs to be used for the assigned resource(s) for the UE(s) among single-mode and dual-mode SL LCHs. In some embodiments, the configured MCSs may be indicated by using a list, a threshold, or a range. By using different MCSs with different spectral efficiency, the maximal TB size that can be carried in the allocated resource(s) can be different. In an embodiment, apparatus 10 may be controlled by memory 14 and processor 12 to transmit, together with the resource allocation information, an IE indicating the LCP configuration. In an embodiment, when a static LCP configuration has been provided, the IE can be used to indicate whether the assigned resource can be multiplexed by certain dual-mode SL LCHs or not. In this manner, apparatus 10 can preserve the flexibility to restrain certain dual-mode SL LCH(s) from using certain configured mode-1 resources. According to one embodiment, the IE can be used to indicate the LCP configuration and restriction for the dual-mode SL LCHs to use the allocated mode 1 resource. In this embodiment, the LCP configuration and restriction may only apply for this assigned resource, or it may apply until another IE deactivates it. As such, apparatus 10 is able to dynamically adjust the LCP configuration of the dual-mode SL LCH for each assigned resource.

According to an embodiment, apparatus 10 may be controlled by memory 14 and processor 12 to indicate, in the SL grant, a rule and/or criteria for how the dual-mode SL LCHs use the SL grant of mode 1, e.g., using physical layer signaling rather than using RRC signaling.

In an embodiment, apparatus 10 may be controlled by memory 14 and processor 12 to adjust the NW configurations by allocating a dedicated resource for packet transmission of the dual-mode SL LCH(s), in order to help their buffered data to be transmitted quickly. In another embodiment, apparatus 10 may be controlled by memory 14 and processor 12 to adjust the NW configurations by adjusting the configuration for the resources assigned to the corresponding single-mode SL LCH. For instance, apparatus 10 may restrict a dual-mode SL LCH from the list of the dual-mode SL LCHs that can be multiplexed into the same configured resource. Alternatively, apparatus 10 can also increase the size of the future configured resources for the corresponding single-mode SL LCH. In another embodiment, apparatus 10 may be controlled by memory 14 and processor 12 to adjust the NW configurations by modifying the LCP configuration for the dual-mode SL LCH(s) and/or by reconfiguring a dual-mode SL LCH to a single-mode SL LCH. According to certain embodiments, if NW configuration has been adjusted, apparatus 10 may be controlled by memory 14 and processor 12 to send the adjusted NW reconfiguration to the UE(s).

Figure 3B:
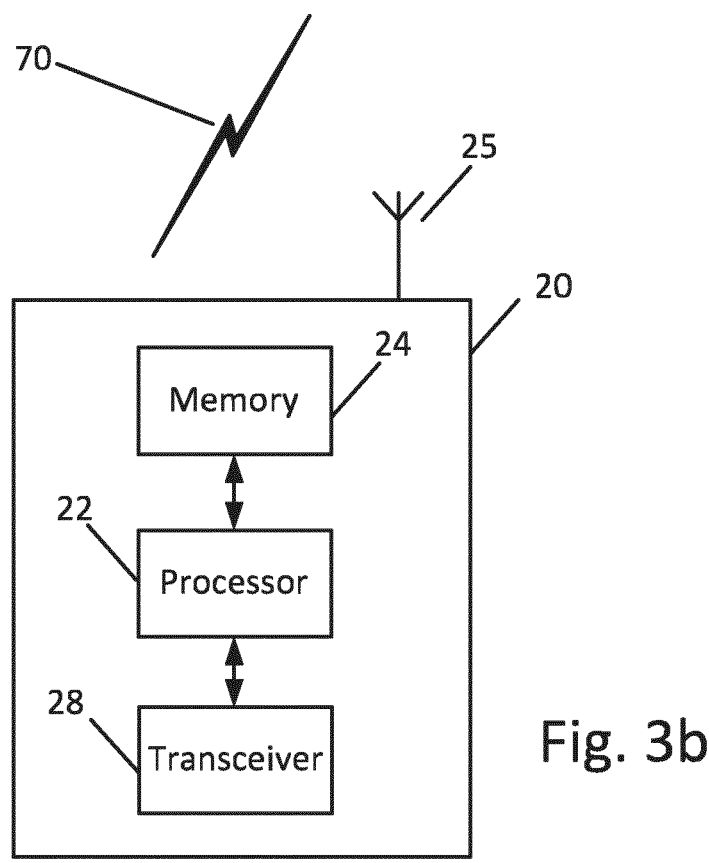
FIG. 3b illustrates an example block diagram of an apparatus, according to an embodiment.

FIG. 3b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 3b.

As illustrated in the example of FIG. 3b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 3b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may foil a part of transceiving circuitry.

As discussed above, according to some embodiments, apparatus 20 may be a UE (e.g., SL UE), mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 1, 2a or 2b. In certain embodiments, apparatus 20 may include or represent a UE, such as a SL UE, and may be configured to perform a procedure relating to configuring and/or applying mode selection for dual-mode SL LCHs, for instance.

In certain embodiments, apparatus 20 may be controlled by memory 24 and processor 22 to, during configuration or reconfiguration of a SL LCH, receive an indication or configuration of dual-mode LCH(s) to enable simultaneous SL mode 1 and SL mode 2 transmission. According to one embodiment, apparatus 20 may be controlled by memory 24 and processor 22 to, when the dual-mode SL LCH(s) is configured, receive a criteria or rule for selecting one of the SL mode 1 or the SL mode 2 for data transmission of the configured dual-mode SL LCH(s) and a corresponding SL BSR configuration.

According to one embodiment, apparatus 20 may be controlled by memory 24 and processor 22 to receive an indication of triggers and/or events for configuring and/or sending a SL BSR. For instance, in one embodiment, apparatus 20 may be controlled by memory 24 and processor 22 to receive an indication that the buffer status of the dual-mode SL LCH should not be included in the BSR. In another embodiment, apparatus 20 may be controlled by memory 24 and processor 22 to receive an indication of events regarding when a dual-mode SL LCH should report its buffer status in the BSR. In an embodiment, the events may include one or more of the following: the channel busy ratio of the SL mode 2 is above a threshold, the data volume in the buffer is above a threshold, the packet transmission experiences a large delay, and/or a RLF is experienced from using the SL mode 2.

In certain embodiments, apparatus 20 may be controlled by memory 24 and processor 22 to, when at least one of the configured triggers for transmitting BSR is detected, transmit at least one SL BSR that may or may not contain buffer status for one or more configured dual-mode SL LCH(s) according to NW configuration. In an embodiment, apparatus 20 may be controlled by memory 24 and processor 22 to transmit the triggering reason to the NW either in the same message or in a separate message.

According to some embodiments, apparatus 20 may be controlled by memory 24 and processor 22 to receive a SL mode 1 resource allocation message from the NW, where the mode 1 resource allocation may or may not be applied for the dual-mode LCH(s) according to NW configuration. When SL grant of mode 1 is allocated, the resource allocation message may include a plurality of feasible configured MCSs to be used for the assigned resource(s) among single-mode and dual-mode SL LCHs. In some embodiments, the configured MCSs may be indicated by using a list, a threshold, or a range. In an embodiment, apparatus 20 may be controlled by memory 24 and processor 22 to receive, together with the resource allocation information, an IE indicating the LCP configuration. In an embodiment, when a static LCP configuration has been provided, the IE may indicate whether the assigned resource can be multiplexed by certain dual-mode SL LCHs or not. According to one embodiment, the IE may also indicate the LCP configuration and restriction for the dual-mode SL LCHs to use the allocated mode 1 resource. In this embodiment, the LCP configuration and restriction may only apply for this assigned resource, or it may apply until another IE deactivates it.

According to some embodiments, apparatus 20 may be controlled by memory 24 and processor 22 to, based on the received resource allocation message and the local information at the UE, select the proper MCS for the transmission and, based on the selected MCS, decide whether a dual-mode SL LCH can multiplex with other single-mode SL LCH(s) into the allocated resource. For example, when an MCS with high spectral efficiency is selected, apparatus 20 may be controlled by memory 24 and processor 22 to use the assigned resource to accommodate the data from the both single-mode SL LCH(s) and the dual-mode SL LCH(s), which were configured by the NW. In an embodiment, apparatus 20 may be controlled by memory 24 and processor 22 to select the proper MCS based on different considerations, such as real-time SL CSI, the latency requirement of the data from the dual-mode SL LCHs and the SL channel sensing/measurement result, and/or based on whether the UE-selected mode 2 resource can only accommodate part of the data from the dual-mode SL LCH(s). In the latter case, according to one example, apparatus 20 may be controlled by memory 24 and processor 22 to select an MCS with high spectral efficiency to carry both the data from the single-mode SL LCH(s) and also the rest of the data from the dual-mode SL LCH(s).

In an embodiment, apparatus 20 may be controlled by memory 24 and processor 22 to transmit packet(s) over the assigned mode-1 resource to a peer SL UE (e.g., SL RX UE). According to one embodiment, if a MCS with high spectral efficiency has been selected, apparatus 20 may be controlled by memory 24 and processor 22 to transmit the packet(s) over the mode-1 resource containing the data from the dual-mode SL LCH(s).

In certain embodiments, apparatus 20 may be controlled by memory 24 and processor 22 to receive adjusted reconfiguration information from the NW and, based on the received reconfiguration information, to reconfigure the SL LCHs and perform the transmission accordingly.

Therefore, certain example embodiments provide several technological improvements, enhancements, and/or advantages over existing technological processes and constitute an improvement at least to the technological field of wireless network control and management. For example, according to certain embodiments, an efficient solution for configuring and applying a packet-level mode selection for dual-mode SL LCHs is provided. Some embodiments can reduce or prevent packet collisions. Additionally, certain embodiments are able to improve resource allocation and resource usage. Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

What is claimed is:

1. An apparatus, comprising:
   at least one processor; and
   at least one memory comprising computer program code,
   the at least one memory and computer program code configured, with the at least one processor, to cause the apparatus at least to
      configure one or more dual-mode sidelink (SL) logical channels (LCHs) to at least one user equipment (UE) to enable simultaneous SL mode 1 and SL mode 2 transmission;
      configure the dual-mode SL LCHs with two sets of logical channel prioritization (LCP) configurations, wherein one of the LCP configurations is for mode 1 operation and another of LCP configurations is for mode 2 operation,
      wherein the LCP configuration for mode 1 indicates how the data from the dual-mode SL LCHs should be multiplexed with the data from the other SL LCHs by using the mode 1 resource, and
      wherein the LCP configuration for mode 2 indicates a policy regarding how the data from the dual-mode SL LCHs should be multiplexed with the data from the other SL LCHs by using the mode-2 resource;
      receive, from the at least one UE, at least one SL buffer status report (BSR) optionally comprising buffer status for one or more of the configured dual-mode LCHs according to a network configuration; and
      transmit, to the at least one UE, a resource allocation that can be applied for the dual-mode LCHs according to the network configuration.

2. The apparatus according to claim 1, wherein, when the dual-mode SL LCHs is configured, the at least one memory and computer program code are configured, with the at least one processor, to cause the apparatus at least to:
   configure the at least one UE with a criteria for selecting one of the SL mode 1 or the SL mode 2 for data transmission of the configured dual-mode SL LCHs and a corresponding SL BSR configuration.

3. The apparatus according to claim 1, wherein the at least one memory and computer program code are configured, with the at least one processor, to cause the apparatus at least to adjust the network configuration according to the received SL buffer status report.

4. The apparatus according to claim 3, wherein, to adjust the network configuration, wherein the at least one memory and computer program code are configured, with the at least one processor, to cause the apparatus to at least one of:
   allocate a dedicated resource for packet transmission of the dual-mode SL LCHs;
   adjust the configuration for the resources assigned to the corresponding single-mode SL LCHs; or
   modify the LCP configuration for the dual-mode SL LCHs or reconfiguring a dual-mode SL LCHs into a single-mode SL LCHs.

5. The apparatus according to claim 4, wherein the at least one memory and computer program code are configured, with the at least one processor, to cause the apparatus at least to transmit the adjusted network configuration to the at least one UE.

6. The apparatus according to claim 1, wherein the at least one memory and computer program code are configured, with the at least one processor, to cause the apparatus at least to configure a rule or criteria regarding how the dual-mode SL LCHs uses a configured resource.

7. The apparatus according to claim 6, wherein, to configure the rule or criteria, the at least one memory and computer program code are configured, with the at least one processor, to cause the apparatus to at least one of:
   configure at least one of a maximum or minimum number of bits for the dual-mode SL LCHs to set as a limitation on usage of SL grant of mode 1 or to set as a limitation on usage of SL mode 2, wherein remaining bits are set to use for SL grant of the other operating mode;
   configure a set of maximum or minimum number of bits, wherein the set corresponds to different mode 2 resource pool conditions; or
   associate the number of bits of dual-mode SL LCHs that can use SL grant of mode 1 with a buffer size reported by the at least one UE in the SL BSR.

8. The apparatus according to claim 1, wherein the at least one memory and computer program code are configured, with the at least one processor, to cause the apparatus at least to:
   configure triggers or behaviors for the at least one UE to report SL buffer status on dual-mode SL LCHs, wherein the triggers or behaviors comprise information for how the dual-mode SL LCHs should include its buffer status into the BSR or when to send the SL BSR.

9. The apparatus according to claim 1, wherein, to transmit the resource allocation, the at least one memory and computer program code are configured, with the at least one processor, to cause the apparatus at least to transmit a plurality of feasible configured modulation and coding schemes (MCSs) to be used for the assigned resource(s) for the at least one UE among single-mode and dual-mode SL LCHs.

10. The apparatus according to claim 1, wherein, to transmit the resource allocation, the at least one memory and computer program code are configured, with the at least one processor, to cause the apparatus at least to provide, together with the resource allocation information, an information element indicating at least one of a LCP configuration or a restriction for the dual-mode SL LCHs to use the allocated mode 1 resource.

11. The apparatus according to claim 1, wherein, to transmit the resource allocation, the at least one memory and computer program code are configured, with the at least one processor, to cause the apparatus at least to indicate, in the SL grant, a rule or criteria for how the dual-mode SL LCHs use the SL grant of mode 1.

12. An apparatus, comprising:
at least one processor; and
at least one memory comprising computer program code, the at least one memory and computer program code configured, with the at least one processor, to cause the apparatus at least to;
receive a configuration of dual mode sidelink (SL) logical channels (LCHs) to enable simultaneous SL mode 1 and SL mode 2 transmission, the dual-mode SL LCHs being configured with two sets of logical channel prioritization (LCP) configurations;
wherein one of the LCP configurations is for mode 1 operation and another of LCP configurations is for mode 2 operation,
wherein the LCP configuration for mode 1 indicates how the data from the dual-mode SL LCHs should be multiplexed with the data from the other SL LCHs by using the mode 1 resource, and
wherein the LCP configuration for mode 2 indicates a policy regarding how the data from the dual-mode SL LCHs should be multiplexed with the data from the other SL LCHs by using the mode-2 resource;
transmit at least one SL buffer status report (BSR) optionally comprising buffer status for one or more configured dual-mode LCHs according to a network configuration; and
receive a SL mode 1 resource allocation message that can be applied for the dual-mode LCHs according to the network configuration.

13. The apparatus according to claim 12, wherein, when the dual-mode SL LCHs is configured, the at least one memory and computer program code are configured, with the at least one processor, to cause the apparatus at least to receive a criteria or rule for selecting one of the SL mode 1 or the SL mode 2 for data transmission of the configured dual-mode SL LCHs and a corresponding SL BSR configuration.

14. The apparatus according to claim 12, wherein the at least one memory and computer program code are configured, with the at least one processor, to cause the apparatus at least to receive an indication of triggers or events for configuring and sending a SL buffer status report (BSR).

15. The apparatus according to claim 14, wherein, to receive the indication of triggers or events, the at least one memory and computer program code are configured, with the at least one processor, to cause the apparatus at least to receive an indication of events regarding when a dual-mode SL LCHs should report its buffer status in the BSR.

16. The apparatus according to claim 14, wherein the events comprise at least one of:
a channel busy ratio of the SL mode 2 being above a threshold,
a data volume in the buffer being above a threshold,
a packet transmission experiences a large delay, or
a radio link failure (RLF) is experienced from using the SL mode 2.

17. The apparatus according to claim 12, wherein, when SL grant of mode 1 is allocated, the resource allocation message comprises a plurality of feasible configured modulation and coding schemes (MCSs) to be used for assigned resources among single-mode and dual-mode SL LCHs.

18. The apparatus according to claim 12, wherein, to receive the resource allocation, the at least one memory and computer program code are configured, with the at least one processor, to cause the apparatus at least to receive, together with the resource allocation information, an information element indicating at least one of the LCP configuration and restriction for the dual-mode LCHs to use the allocated mode 1 resource.

19. The apparatus according to claim 12, wherein the at least one memory and computer program code are configured, with the at least one processor, to cause the apparatus at least to, based on the received resource allocation message and local information at the apparatus, select a proper modulation and coding scheme (MCS) for the transmission and, based on the selected modulation and MCS, decide whether a dual-mode SL LCHs can multiplex with other single-mode SL LCHs into the allocated resource.

20. The apparatus according to claim 12, wherein the at least one memory and computer program code are configured, with the at least one processor, to cause the apparatus at least to transmit one or more packets over the assigned mode-1 resource to a peer SL user equipment (UE).

21. The apparatus according to claim 20, wherein, when a modulation and coding scheme (MCS) with high spectral efficiency has been selected, the at least one memory and computer program code configured, with the at least one processor, to cause the apparatus at least to transmit the packets over the mode-1 resource containing the data from the dual-mode SL LCHs.

22. The method according to claim 12, wherein the at least one memory and computer program code are configured, with the at least one processor, to cause the apparatus at least to:
receive adjusted reconfiguration information from the network; and
based on the received reconfiguration information, reconfigure the SL LCHs and perform the transmission accordingly.

23. A computer program embodied on a non-transitory computer readable medium, said computer program comprising program instructions which, when executed in hardware, cause the hardware to perform a method comprising:
receiving, at a SL user equipment (UE), an indication or configuration of dual mode sidelink (SL) logical channels (LCHs to enable simultaneous SL mode 1 and SL mode 2 transmission, the dual-mode SL LCHs being configured with two sets of logical channel prioritization (LCP) configurations;
wherein one of the LCP configurations is for mode 1 operation and another of LCP configurations is for mode 2 operation,
wherein the LCP configuration for mode 1 indicates how the data from the dual-mode SL LCHs should be multiplexed with the data from the other SL LCHs by using the mode 1 resource, and
wherein the LCP configuration for mode 2 indicates a policy regarding how the data from the dual-mode SL LCHs should be multiplexed with the data from the other SL LCHs by using the mode-2 resource;
transmitting at least one SL buffer status report (BSR) optionally comprising buffer status for one or more configured dual-mode LCHs according to a network configuration; and
receiving a SL mode 1 resource allocation message that can be applied for the dual-mode LCHs according to the network configuration.

* * * * *